Oct. 21, 1952     R. A. HANSON     2,615,099
LEVEL SENSITIVE SWITCH
Filed May 16, 1950
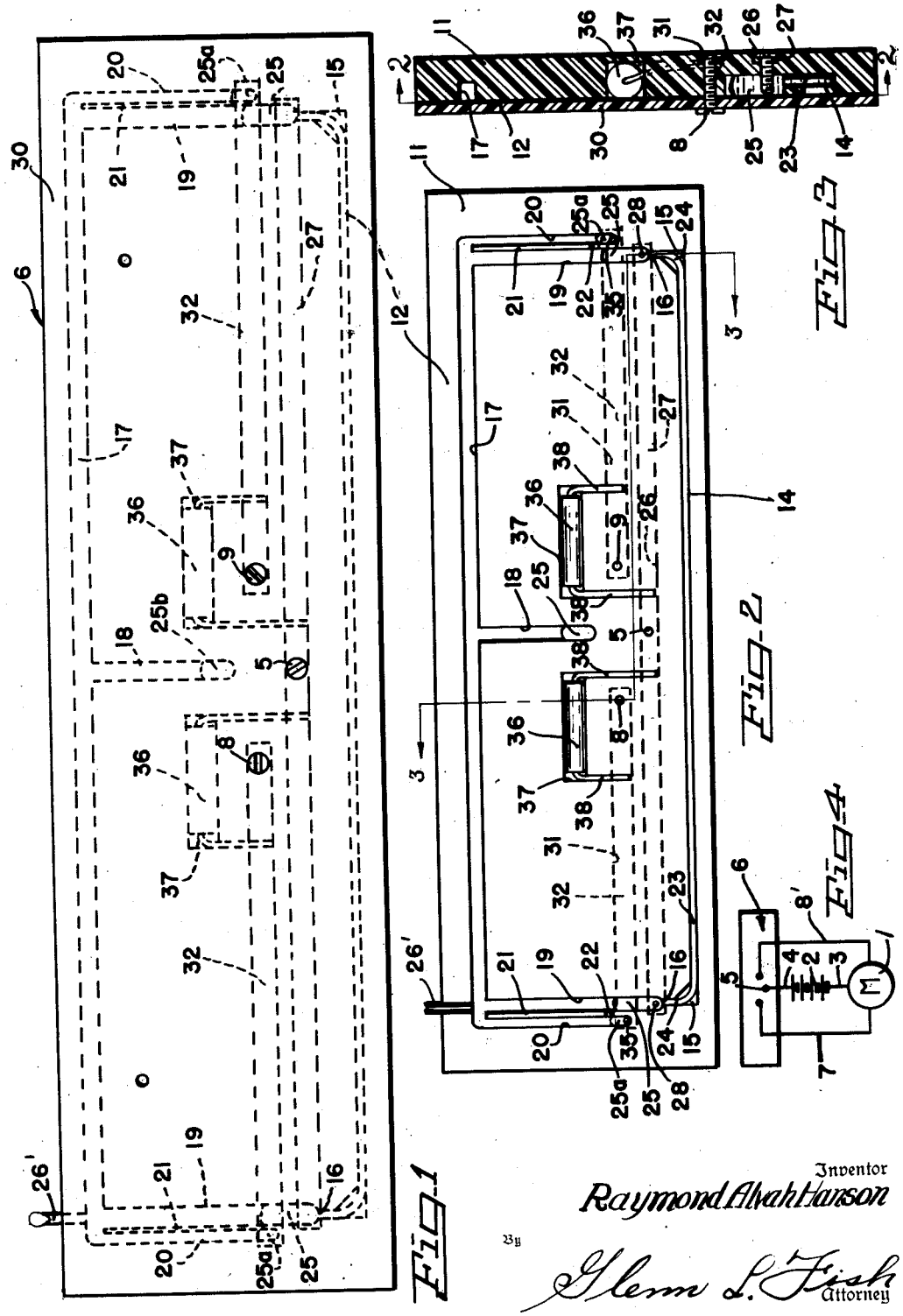
Inventor
Raymond Alvah Hanson
By
Glenn L. Fish
Attorney Patented Oct. 21, 1952

2,615,099

UNITED STATES PATENT OFFICE 2,615,099

LEVEL SENSITIVE SWITCH

Raymond Alvah Hanson, Palouse, Wash.

Application May 16, 1950, Serial No. 162,156

4 Claims. (Cl. 200—33)

This invention relates to switches and it is one object of the invention to provide a switch which is particularly adapted for use upon harvesters and other portable machines which should be kept substantially level while in operation but will not be damaged or prevented from operating in an efficient manner if momentarily tilted out of a horizontal position while moving along rough ground.

It is one object of the invention to provide a switch which will remain open when the machine is substantially level and automatically closed if the machine is tilted and remains in the tilted position a predetermined length of time.

Another object of the invention is to provide a a switch wherein pockets in the body of the switch contain mercury which is allowed to flow into and out of a circuit closing position at such a slow rate of speed that opening and closing of the circuit will only occur when the machine remains in a tilted position for a predetermined length of time.

Another object of the invention is to provide a delayed action switch that has a body formed at one side with grooves in which conductor strips are mounted and at its other side with pairs of vertical pockets into which terminal members of the conductors extend, and into lower ends of certain ones of which extends ends of a tube of small diameter, communication being established between the pockets of each pair of pockets by a very small opening through which mercury in the tube and the pocket flows from one pocket to another at a very slow rate of speed to close a circuit when the body is tilted to a predetermined angle and remains in the tilted position a sufficient length of time for closing of the circuit to take place.

The invention is illustrated in the accompanying drawings wherein:

Fig. 1 is a side view of the improved switch.

Fig. 2 is a view taken along the line 2—2 of Figure 3 and showing the switch in elevation with its cover plate removed.

Fig. 3 is a transverse sectional view taken along the line 3—3 of Figure 2.

Fig. 4 is a diagram showing a motor and its circuit with which the switch is used.

This improved switch, which may be referred to as a delayed action switch, is intended for use upon farm machines, portable machines which should be kept substantially level when in use but are subject to momentary tilting which would be liable to occur when a farm machine is driven across fields having furrows or other low places through which wheels of the machine pass during use of the machine. When such momentary tiltings occur it is not desired to have the circuit controlled by the switch closed but when sloping ground is encountered of sufficient length to cause the machinery to be tilted for an appreciable length of time it is desired to have the circuit closed and a motor energized so that an angularly adjustable portion of the machine will be tilted until it is restored to a horizontal position. The machine has not been illustrated, as it may consist of a harvesting machine and other specific machines, but in Figure 4 there has been shown a motor 1 with which a source of electric energy 2 is connected by a conductor wire 3. A second wire 4 connects the other side of the battery or equivalent source of energy 2 to a center contact 5 of the improved switch 6 and from opposite sides of the motor 1 extend wires 7 and 8' which are connected with terminal 9 of the switch. When the wire 4 is out of circuit with both of the wires 7 and 8 the motor 1 is shut off and the tiltable portion of the machine with which the motor cooperates will be level. If the tiltable portion of the machine is tilted in one direction a circuit will be established between the wire 4 and the wire 7 and the motor energized to restore the tiltable portion of the machine to a level position and when level position is attained the motor will be shut off automatically. Movement of the machine onto level ground will effect movement of the tiltable portion of the machine to an inclined position in an opposite direction and a circuit will be closed between the wires 4 and 8' and the motor energized to turn in a direction to restore the tiltable portion of the machine to a level position and the circuit will again be broken to shut off the motor. The switch is of a special construction which will cause delayed action closing and opening of the switch and therefore closing or opening of the switch will not occur when wheels off the machine are passing through small depressions in the ground but will take place when the machine is traveling a sloping surface of sufficient length to necessitate leveling action.

A practical embodiment of the level sensitive switch, is illustrated in Figures 1, 2, and 3, and referring to these figures it will be seen that the switch has an elongated body 11 formed of transparent non-conductive material, such as synthetic rosin, and is of oblong shape and has flat side faces 12 and 13. A groove 14 is formed in the side face 12 longitudinally thereof near its lower edge and this groove has enlarged triangular shaped end portions 15 and upwardly projecting terminal portions 16. Near the upper edge of the side face 12 is formed another longitudinally extending groove 17 having a downwardly extending arm 18 midway its length and having its opposite ends each communicating with upper ends of interconnected inner and outer pockets 19 and 20. The companion pockets 19 and 20 of each pair are separated from each other by a partition 21 and the pocket 20 of each pair is shorter than the companion pocket 19 and has its lower end spaced upwardly above the bottom of the said pocket 19 and connected therewith by a minute perforation or opening 22 formed through the partition 21 near the lower end of the partition. A tube 23 extends longitudinally in the groove 14 and has its end portions 24 bent upwardly through the enlargements 15 and fitted into the terminal portions 16 and communicating with lower ends of the pockets 19. This tube is filled with mercury 25, or an equivalent conductive fluid, the quantity of mercury being such that portions enter lower ends of the inner pockets 19 and terminate below the perforations 22. This mercury is poured into the switch through an inlet passage 26' which is then closed by a plug, or in any other desired manner, and flows through the tube until lower portions of the pockets 19 are filled to a level below the perforations 22. Portions 25a of the mercury also fill lower ends of the outer pockets 20 to a level below the perforations and in the arm 18 is a surplus supply of mercury 25b.

In the other side face of the body is formed a longitudinally extending groove 26 in which is fitted a strip of conductive metal 27 secured at its ends by screws 28 which enter the lower ends of the pockets 19 and have contacting engagement with mercury therein. Midway its length the strip 27 is secured by the screw 5 which passes through a plate 30 covering the first mentioned side face of the body and constitutes the terminal to which the wire 4 is secured. Above the groove 26 are formed other grooves 31 in which are mounted strips 32 of conductive metal having their inner ends secured by screw terminals 8 and 9 and their outer ends secured by screws 35 which enter lower ends of the outer pockets 20 and have contacting engagement with the mercury 25a therein. When the body is level mercury in the pockets 19 will be out of contact with mercury in the pockets 20 and the motor will be idle. When the level is tilted longitudinally in a vertical direction and remains in the tilted position a sufficient length of time mercury will flow through the tube 23 very slowly and raise the level in one pocket 19, whereupon it will flow through perforation 22 between the pockets 19 and 20 of the lower set of pockets and close the circuit through the motor and thus start the motor. The motor will then impart leveling movement to the portion of the machine upon which the level is mounted and continued until the said portion of the machine is leveled. The mercury will then slowly return through the tube 23 until contact between the portions of the mercury in the pockets 19 and 20 is broken and the motor will be stopped. The motor then remains idle until the machine reaches a level stretch of ground and as the tiltable portion of the machine remains in the position to which it has been tilted by the motor, contact will be established between mercury in the companion pockets at the other end of the level and the motor will be turned in an opposite direction and the tiltable portion of the machine again leveled. The fact that the mercury will flow very slowly through the tube 23 prevents mercury in the companion pockets 19 and 20 from quickly moving into or out of engagement with each other and momentary tilting of the machine by its wheels passing into and out of ruts and other depressions in a field will not cause a circuit to be closed or broken as the mercury does not have sufficient time to flow through the perforations and accomplish making or breaking of the circuit. Spark arrestors 36, which are condensers or equivalent capacitors, are mounted in recesses 37 formed in the side face 12 of the body and connected with the strips 27 and 32 by conductors 38.

Having thus described the invention, what is claimed is:

1. A switch comprising an elongated body having opposed side faces, a cover plate for one side face of said body, the said one side face of said body being formed with a longitudinally extending groove near its lower edge and with a second longitudinally extending groove near its upper edge, the upper groove having each end communicating with downwardly extending grooves spaced laterally from each other and constituting pairs of companion inner and outer pockets, the pockets of each pair being separated from each other by a partition formed near its lower end with a minute perforation establishing communication between the companion inner and outer pockets, a tube extending longitudinally in the lower groove and having end portions extending upwardly and communicating with lower ends of the inner pockets, said tube being filled with mercury, a portion of said mercury extends into lower ends of the inner pockets and normally terminates below the perforations, the outer pockets also having mercury in their lower ends spaced downwardly from the perforations in the partitions and the upper groove having leading therefrom a depending groove constituting a reservoir for a reserve supply of mercury, a lower conductor strip and a pair of upper conductor strips mounted in grooves formed in the other side face of said body, screws securing ends of the lower strip to the body and entering lower ends of the inner pockets a screw intermediate the length of the lower strip serving to connect a conductor wire with the lower strip, screws securing inner and outer ends of the upper strips, its outer screws entering lower ends of the outer pockets and the inner screws serving to connect conductor wires with the upper strips, and recesses formed in said body and adapted to receive condensers for connection with the upper and lower strips in bridging relation thereto.

2. A delayed action switch comprising a body having side faces, one side face being formed with upper and lower grooves, the upper groove having each end communicating with companion vertically extending inner and outer pockets separated from each other by partitions and communicating with each other through small openings formed through the partitions near lower ends of the pockets, a tube extending longitudinally in the lower groove and having upwardly extending ends communicating with lower ends of the inner pockets, said tube and lower ends of the inner pockets being filled with mercury normally spaced downwardly from the perforations, there being also mercury in the outer pockets below the perforations, a conductor strip at the other side of said body, secured at its ends by screws entering lower end portions of the inner pockets and intermediate its length being provided with a wire-engaging fastener, and conductor strips above the first strip having inner ends secured by wire-engaging fasteners and outer ends secured by fasteners entering lower end portions of the outer pockets.

3. A delayed action switch comprising a body formed with a longitudinally extending groove and with pairs of companion inner and outer pockets, the pockets of each pair communicating with each other through small openings spaced upwardly from lower ends of the pockets, a tube extending longitudinally in said groove and having its ends communicating with lower edges of the inner pockets, mercury-filling said tube and lower portions of the inner pockets and normally spaced downwardly from the openings, mercury in lower portions of the outer pockets and normally spaced downwardly from the openings, a conductor strip extending longitudinally of said body and having members at its ends entering the inner pockets and contacting mercury therein, and a pair of conductor strips having members at their ends entering the outer pockets and contacting mercury therein.

4. A delayed action switch comprising a body formed with pairs of companion pockets, the pockets of each pair having communication with each other through a small opening spaced upwardly from bottoms of the pockets, a tube carried by said body and having its ends communicating with one pocket of each pair, said tube and lower portions of the pockets being filled with mercury normally spaced downwardly from the openings, a conductor strip carried by said body and adapted to have a conductor wire connected with it, said strip having terminal members at its ends entering one pocket of each pair of pockets and contacting mercury therein, and contact strips carried by said body and adapted to have conductive wires connected with them and each having a terminal member entering the second pocket of a pair of pockets and contacting mercury therein.

RAYMOND ALVAH HANSON.

REFERENCES CITED

The following references are of record in the file of this patent:

UNITED STATES PATENTS

| Number    | Name     | Date          |
|-----------|----------|---------------|
| 444,506   | Robinson | Jan. 13, 1891 |
| 1,931,967 | Steiner  | Oct. 24, 1933 |
| 1,997,288 | Anderson | Apr. 9, 1935  |
| 2,477,927 | Hanson   | Aug. 2, 1949  |